United States Patent

[11] 3,588,710

[72] Inventor Harvey M. Masters
Ellicott City, Md.
[21] Appl. No. 750,137
[22] Filed Aug. 5, 1968
[45] Patented June 28, 1971
[73] Assignee Westinghouse Electric Corporation
Pittsburgh, Pa.

[54] DIGITAL PHASE DETECTION CIRCUITRY
9 Claims, 9 Drawing Figs.

[52] U.S. Cl. .......... 328/133, 307/262, 307/265, 307/295, 318/599, 318/608, 323/101, 324/83, 328/155
[51] Int. Cl. .......... H03b 3/04
[50] Field of Search .......... 328/58, 133, 155; 307/210, 232, 262, 265, 295; 324/83 (FCE); 323/101; 318/20.310, 20.370

[56] References Cited
UNITED STATES PATENTS
3,328,688 6/1967 Brooks .......... 328/133X
3,430,148 2/1969 Miki .......... 328/133

*Primary Examiner*—Stanley T. Krawczewicz
*Attorneys*—F. H. Henson and E. P. Klipfel

ABSTRACT: A sensitive, digital, phase-detection circuit incorporating a phase-error threshold. The circuit converts two sinusoidal samples of voltage and/or current into digital form and inspects their phase relationships. An output indicates the phase error direction and notifies an external circuit whenever the phase difference exceeds a predetermined value. No adjustments are required, even though input levels and operating frequencies may vary over wide ranges. No digital clocks of any type are used. The information detected may be fed to servo systems, display systems, or to other control devices. Micrologic elements may be advantageously used.

Patented June 28, 1971 | 3,588,710

4 Sheets-Sheet 1

WITNESSES:
Leon M. Garman
James F. Young

INVENTOR
Harvey M. Masters
BY Ernest P. Klipfel
ATTORNEY

DIGITAL PHASE DETECTION CIRCUITRY

BACKGROUND OF THE INVENTION

1. Field of the Invention

The present invention relates generally to digital phase-detection circuits and more particularly relates to a digital phase detector capable of accurately detecting small phase differences without the use of a digital clock.

2. Description of the Prior Art

Analog phase detectors very employ reflectometers, ring modulators, or other diode configurations which are then followed by filtering circuits. One or more transformers are customarily used. Balancing adjustments are normally required to compensate for differences in diode characteristics. The direct current output level, which is proportional to the phase difference magnitude, is usually very small for small phase angles and must be amplified. The direct current amplifiers are required to have low noise levels and extremely low drift. Some of these circuits are sensitive to frequency, input levels, or line impedance and may require adjustments if one or more of these characteristics is changed.

Where digital methods are used to detect phase differences a string of pulses is derived from flip-flop, the width of the pulses representing the difference in phase. However, as the flip-flop experiences a transition from a point near zero phase error a string of random width pulses is generated. This point of instability limits the use of this method. Another method of digital detection of phase differences simply gates the two signals. But this system produces pulses which are sensitive to both edges of the input signals. Such a system requires squarer circuits which have been designed with extreme care to avoid distortion of the waveform symmetry; that is, both edges of the squarer output waveform must coincide with the zero crossover points of its input sine wave. Hence, varying input voltage levels, changes in operating frequency, and environmental variations can result in erroneous measurement and detection unless the squarer circuits are exceptionally good. Many digital phase detection circuits of the prior art require the use of digital clocks.

It is an object of the present invention to provide a digital phase detection circuit which is reliable, requires no digital clock, and which is insensitive over wide ranges to input level variations, changes in input power levels and line impedances.

Another object of the present invention is to provide a digital phase detection circuit capable of uniform operation over a wide frequency range.

Another object of the present invention is to provide a digital phase-detection circuit having a sensitivity that can be preset to virtually any desired value.

Another object of the present invention is to provide a digital phase-detection circuit requiring no operational adjustments.

Another object of the present invention is to provide a digital phase-detection circuit wherein the usual squarer circuits are not critical.

SUMMARY OF THE INVENTION

Briefly, the present invention accomplishes the above-cited objects by providing a circuitry for generating a string of pulses having widths the same as the phase difference between input signals to be sensed. Both leading and lagging pulse strings are generated from the like-going edges of the input signals such as the negative going edges for example. A lagging pulse string occurs when the average value of a digitized representation, obtained through operation of a JK flip-flop, exceeds a predetermined magnitude whereupon one input signal is gated with the complement of the other input signal to provide the pulse string representative of the extent by which one input signal lags the other. A leading pulse string occurs when the average value of a digitized representation exceeds a predetermined magnitude thereby generating a string of pulses having widths indicative of the phase difference in the leading sense. No pulse string occurs when both input signals are in phase.

Should the widths of either string of pulses be greater than a reference pulse provided by a One Shot generator, an output signal of constant magnitude will result and will remain at that constant level until the phase difference between the two output signals is corrected. When a phase difference occurs, another output indicates the polarity of the phase difference.

BRIEF DESCRIPTION OF THE DRAWING

For a better understanding of the present invention together with other and further objects thereof, reference is directed to the following detailed description taken in conjunction with the drawing, in which:

Referring to FIG. 1, samples of the two sinusoidal waveforms whose phase relationship is to be examined are fed into squarer circuits 2 and 4 of the digital phase detector 1 where the input signals 6 and 8 are converted into digital square waves. The two input sine waves 6 and 8 may be samples of two voltages or of two currents, or, as indicated in FIG. 1, of one voltage and one current. In any event, the two squarer circuits 2 and 4 must not distort the phase relationship between their input and output; that is, the phase difference between the two square waves A and B resulting from the squarer circuits must be the same as that of the two sine wave inputs.

The outputs A and B of the two squarers are fed to a JK flip-flop 10 in the manner shown. The two flip-flop outputs 12 and 14 are always the inverse of each other; for example, if the upper output 12 is a ONE, the lower output 14 must be a ZERO.

Logic definitions will now be provided for purposes of clarity. For purposes of illustration, a ZERO is defined as a voltage at or near zero volts while a ONE is defined as a voltage at or near +6 volts. Further, a NAND gate is defined to produce a ONE output when a ZERO is present on one or more of its inputs while a ZERO output shall occur only when all the inputs thereto are ONE.

Figure 2:
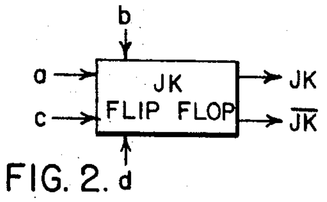
FIG. 2 is a symbolic representation of a device utilized in the illustrative embodiment of FIG. 1.

A JK flip-flop such as illustrated by the block 10 is more particularly identified in FIG. 2. A negative-going edge is required at the input to switch the flip-flop outputs. The output $\overline{JK}$ is always the inverse of the output JK. Signals *a* and *b* are the set inputs. Signals *c* and *d* are the reset inputs. A negative-going edge at input *a* (or input *b*) produces a ONE at the output JK provided input *b* (or input *a*) is a ONE when the edge occurs. A negative-going edge at input *c* (or input *d*) produces a ZERO at output JK provided input *d* (or input *c*) is a ONE when the edge occurs. Once the flip-flop is set, succeeding edges at the set inputs have no effect on the outputs. The same is true for reset inputs once the flip-flop is reset.

Figure 3:
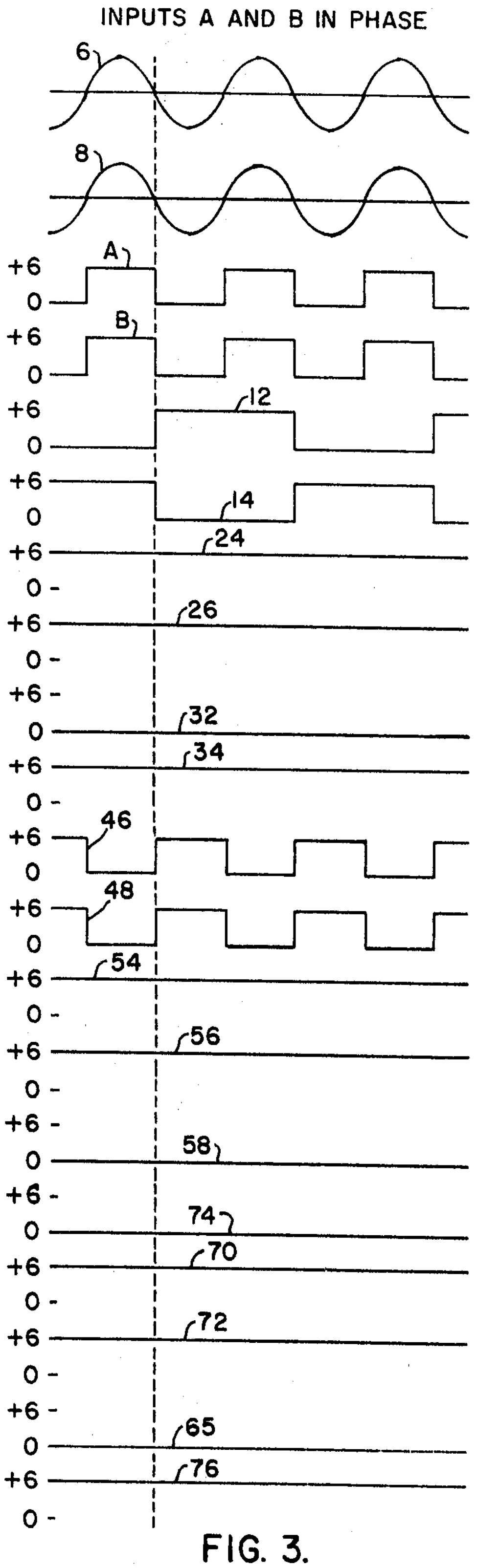
FIGS. 3, 4 and 5 illustrate operational waveforms of the illustrative embodiment shown in FIG. 1 under conditions of in phase, lag and lead, respectively.
Figure 4:
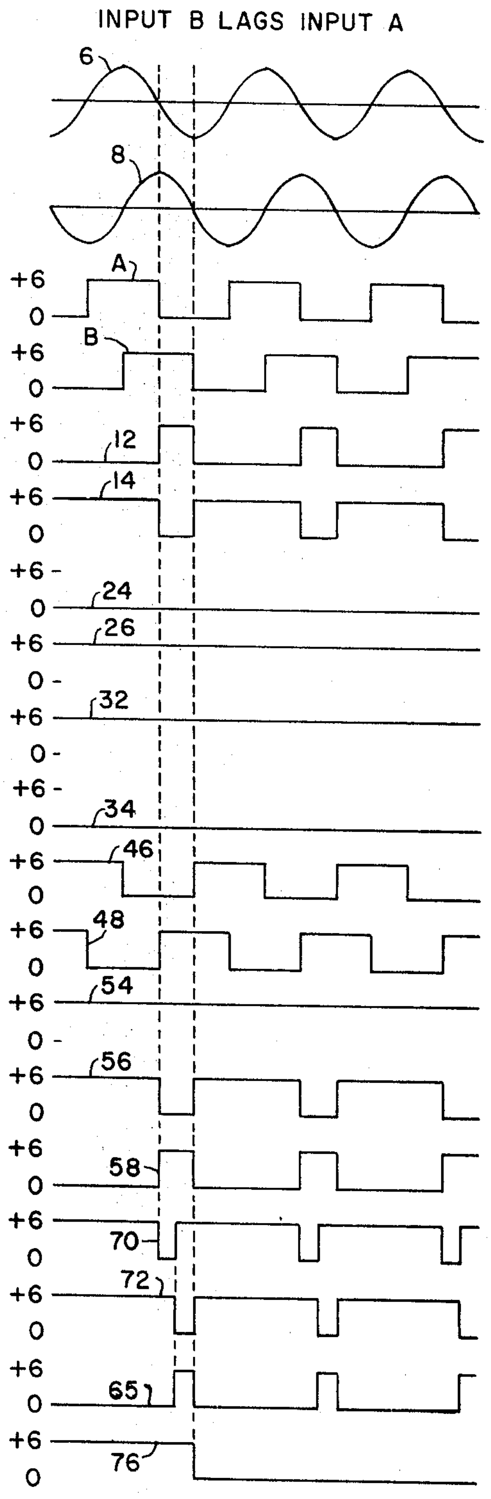
Figure 5:
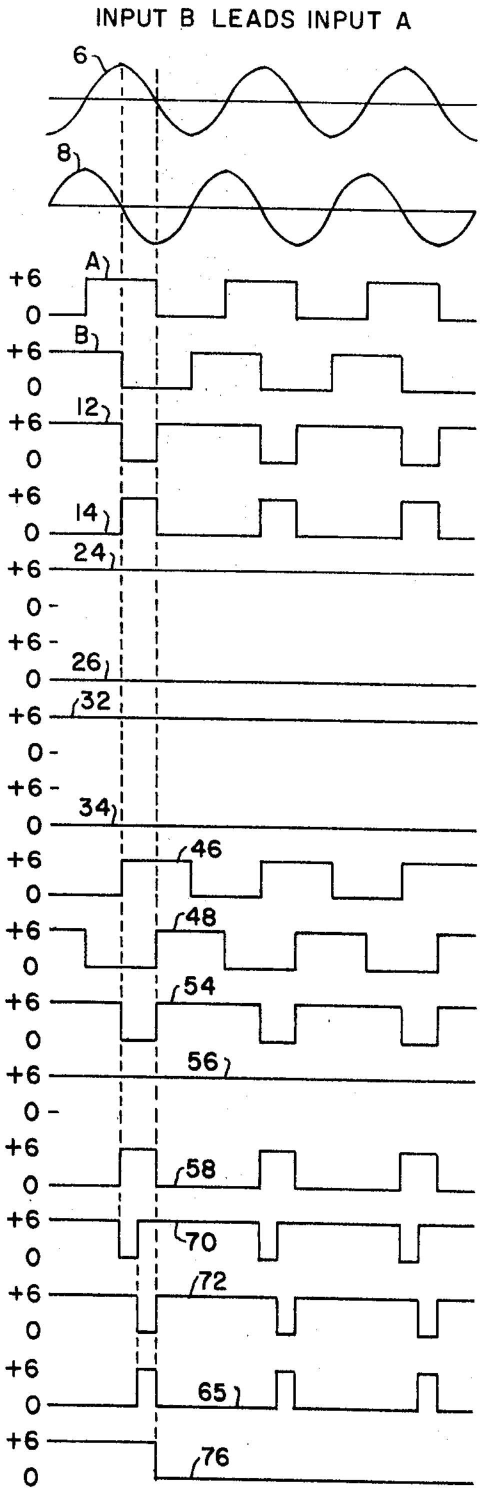

Referring again to FIG. 1, whenever the two input signals A and B are in phase, the flip-flop 10 will divide by two as shown in the operational waveforms of FIG. 3. In the case of either a lagging or leading phase difference, the flip-flop output waveforms 12 and 14 will appear as shown in FIGS. 4 and 5, respectively. It is to be noted that the DC component of these waveforms differ and, therefore, can be used as a means for detecting whether the phase is leading or lagging. For example, if a 0 to +6 volt digital signal is assumed, the average value of either flip-flop output 12 or 14 will be +3 volts when no phase difference exists between the two input signals A and B. If, on the other hand, the phase of input signal B lags that of input signal A as shown in FIG. 4, the average value of the flip-flop output 12 will be near 0 volts while that of the output 14 will be near +6 volts. Should the phase change to leading, the average values of the two outputs will reverse. The operational waveforms of the illustrative embodiment when input B leads input A is illustrated in FIG. 5.

The two NAND gates 16 and 18 invert the flip-flop outputs 12 and 14, but the function of these two gates is simply to provide isolation between the flip-flop 10 and following circuits. If isolation is not required, the two gates may be omitted and the two output leads from the JK flip-flop 10 may be interchanged.

The function of a first and a second average detector and threshold circuit 20 and 22 is to detect the average values of the input waveform amplitudes connected thereto by the gates 16 and 18 and to produce an output indication 24 and 26, respectively, whenever this average value exceeds a given level. For example, a threshold voltage of 3.5 to 4 volts will result in the following detector outputs:

| | Detector 20 | Detector 22 |
|---|---|---|
| Input B in phase with input A | ONE | ONE. |
| Input B lags input A | ZERO | ONE. |
| Input B leads input A | ONE | ZERO. |

Thus, whenever the average value of a detector input exceeds a predetermined threshold magnitude of voltage, a logical ZERO is produced at the output, otherwise the detector outputs will be ONE. The two detector outputs 24 and 26 can never be ZERO simultaneously. However, if the input signals to the detectors 20 and 22 are in phase, two ONE's will occur as illustrated in FIG. 3.

The output information from the first and second average detector and threshold circuits 20 and 22 is sensed by NAND gates 28 and 30. In the case of zero phase difference between the input signals A and B the output 32 of the gate 28 will be ZERO while the output 34 of the gate 30 will be a ONE. Under all other conditions gate 28 will have an output 32 which will be a ONE and the gate 30 will have an output 34 which will be a ZERO.

Hence, three bits of information have been derived:

1. An indication is obtained at an output 24 if the input B lags in phase the input A.
2. An indication at the output 26 if the input B leads in phase the input A.
3. An indication in the form of a ZERO at the output 32 gate 28 and a ONE at the output 34 of gate 30 if the two input signals A and B are in phase.

The lag, lead and in phase indications at outputs 24, 26 and 32, respectively, along with the outputs A and B of the squarers 2 and 4, make up the input data to a pulse-string generating circuit 36. The threshold circuit 38 receives the output from the generating circuit 36 and compares the width of pulses in the output string to a reference standard, with the comparison being fed to a second JK flip-flop 40. The output of JK flip-flop 40, labeled GO, gives one indication when the two input signals A and B are in phase or within the tolerable difference preset into the circuit, and another indication when the phase difference between the two input signals reach or exceed the tolerable preset value.

More particularly, the outputs A and B from the squarer circuits 2 and 4 are inverted by NAND gates 44 and 42 which feed the inverted outputs 48 and 46 to NAND gates 52 and 50. If the squarer outputs A and B are in phase, the ZERO output 32 of gate 28 disables the gates 50 and 52, producing a ONE at their outputs 54 and 56, and, consequently, a ZERO at the output 58 of a NAND gate 60. The remainder of the circuitry responsive to the output 58 of the generating circuit 36 will be inactive in this case. The JK flip-flop 40 will remain in its reset state with a ONE at the GO output terminal. when the input signals A and B are in phase, the ONE output 34 of gate 30 enables the reset input 62 of JK flip-flop 40 and the squarer output signal A resets the flip-flop 40. The flip-flop 40 cannot be set again until the output 34 of gate 30 becomes ZERO followed by a negative-going edge at the output 65 of a NAND gate 67.

Should the phase of input B lag that of input A, the output 24 of detector 20 will change to a ZERO and disable the gate 50, producing a ONE at its output 54. Gate 60 is enabled by the digital ONE output 54. The output 26 of the detector 22 and the output 32 of gate 28, which are now both ONE's, enable the gate 52. The gate 52 then gates its two input signals $\bar{A}$ and B. Since gate 60 is enabled, its output 58 becomes $\bar{A}B$. As seen in FIG. 4, the output 58 of gate 60 is a string of pulses whose width is the same as the phase difference between input A and input B.

If the phase changes from lagging to leading, the operation is similar except that the opposite detector and gates are enabled. That is, the output 26 of detector 22 becomes ZERO and disables gate 52 while gate 50 is enabled and gates its two input signals A and $\bar{B}$. The output 58 of gate 60 in this case is $A\bar{B}$. Again, as can be seen from FIG. 5, this waveform 58 is a string of pulses with widths equal to the phase difference between input A and input B.

Thus, the circuit 36, in response to the three bits of information 24, 26 and 32 generates a string of pulses having widths the same as the phase difference between input A and input B, regardless of whether the phase difference is leading or lagging. The circuit 36 also produces a ZERO output in the event of no phase difference. A unique feature of the circuit 36 is that both lagging and leading pulse strings are generated from the negative-going edges of input signals A and B. FIGS. 4 and 5 show these relationships. As a result, the two squarer circuits 2 and 4 need not be required to have perfect symmetry, which is a condition difficult to obtain with varying input voltage levels, changes in operating frequency, and environmental variations. It is still necessary, of course, that the negative-going edges of the two squarer outputs A and B coincide when the input sinusoidal signals 6 and 8 are in phase, but some error can be tolerated in the alignment of the positive-going edges without affecting the operation of the overall system. The circuit, therefore, differs from the usual gating arrangement in which the difference pulse strings are generated by the negative-going edges in one case, of say lagging phase, and by the positive-going edges in the other case.

In some applications the outputs 12 and 14 of the flip-flop 10 can be used as a phase-error indication, since these output waveforms are essentially the same as the output 58 from the pulse-string generating circuit 36. However, one will find, as the phase error increases from zero, the flip-flop 10 changes from dividing-by-two to producing the pulse string shown. As the flip-flop 10 experiences this transition it would generate a string of random width pulses. This unstable condition will result in the reference pulse occurring at spurious times in the threshold circuit 38. In the gating arrangement illustrated in FIG. 1, the time constants of the detectors 20 and 22 eliminate the effect of the instability. The output of the flip-flop 10 is not used as a string of pulses to indicate the amount of phase error but only to indicate whether the phase is leading or lagging. The amount of phase error is determined by the pulse string generating circuit 36. Because of the small time constant in the average detector and threshold circuits 20 and 22 these random width pulses, which last only momentarily, have no effect on the output levels 24 and 26 of these average detectors and threshold circuits. In short, the random width pulses are not associated with and do not enter the one shot threshold circuit 38.

The output 58 of gate 60 feeds the threshold circuit 38 which consists of a One Shot generator 62 and NAND gates 64, 66 and 68. The circuit 38 compares the pulse width of the string 58 to a standard or reference pulse generated by the One Shot 62 or monostable multivibrator. If the width of the pulse in the string 58 is less than the width of the inverted pulse 70 generated by the One Shot 62, the output 72 of the gate 68 will remain of a constant ONE level. However, if the pulse width of the string 58 from the gate 60 exceeds the width of the inverted pulse 70 generated by the One Shot 62, the output 72 of gate 68 will become an inverted pulse having a width equal to the amount each pulse from the gate 60 exceeds the width of the reference pulse 70 from the One Shot 62. As shown in FIGS. 4 and 5, the threshold circuit 38 performs the same whether the phase is leading or lagging. Gates 64 and 66 provide a small amount of delay approximately equal to that of the One Shot generator 62, so that the two signals 70 and 74 being gated at gate 68 have the same delay with respect to the output 58 of gate 60. Gate 67 inverts the output 72 so that the JK flip-flop 40 will operate from a narrow pulse resulting from the inversion of the threshold signal. Once a pulse appears at the output 65 of gate 67, its negative-going edge sets the flip-flop 40, causing the GO output terminal 76 to change from a ONE to a ZERO.

Figure 1:
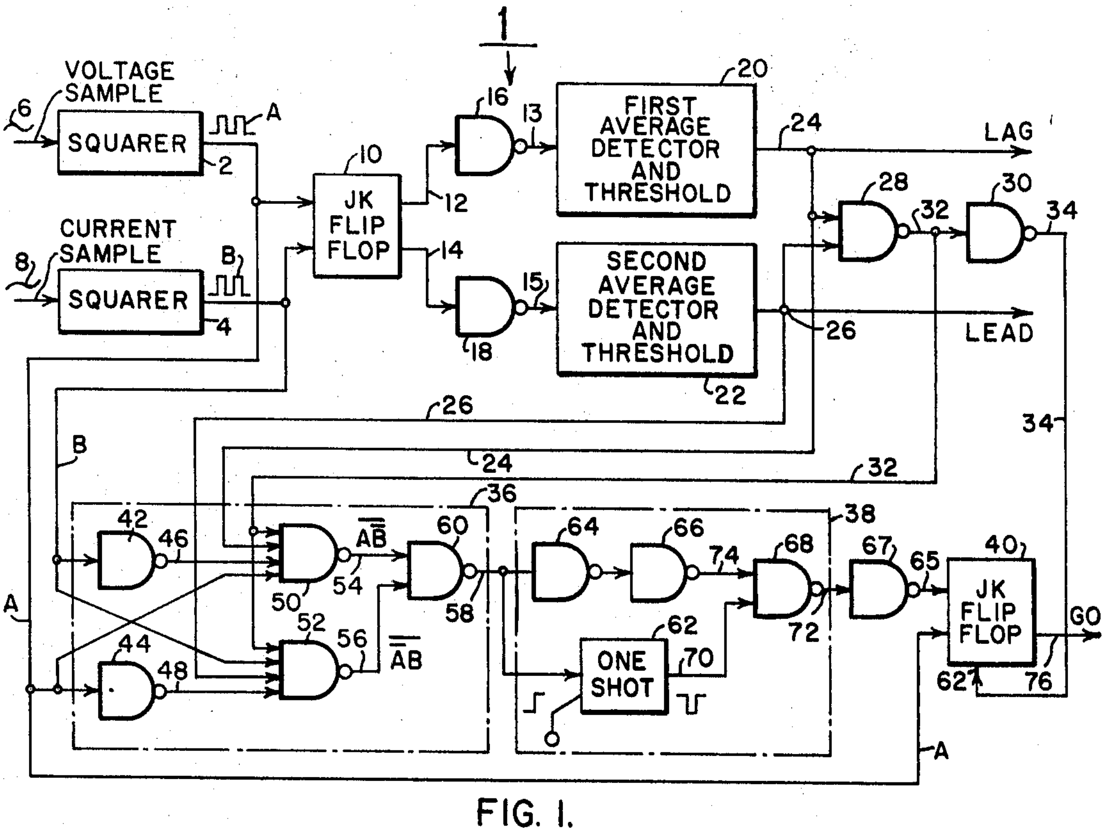
FIG. 1 is a block diagram of an illustrative embodiment of the present invention.
Figure 6:
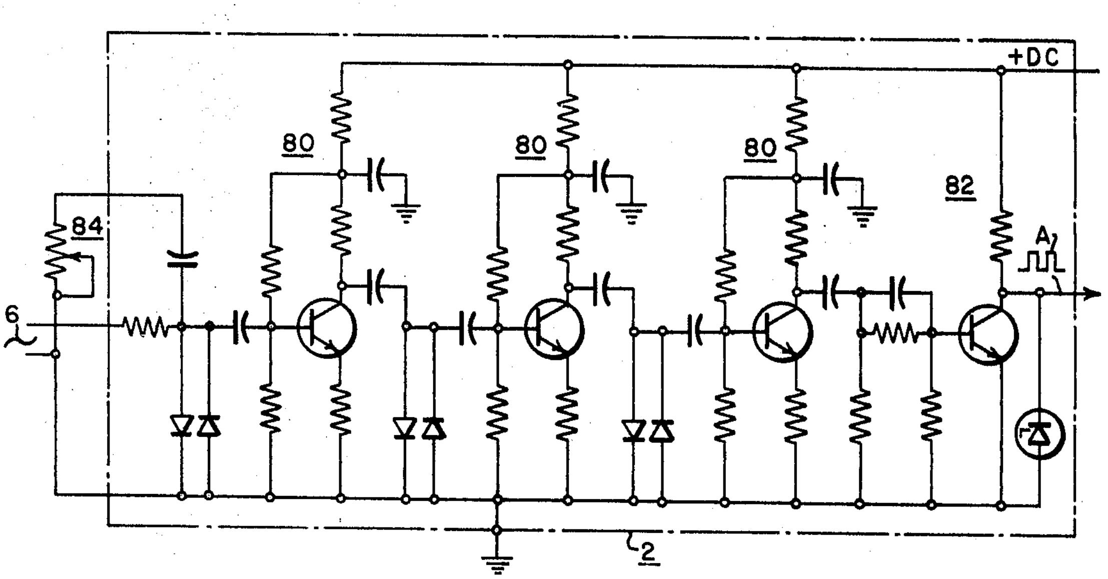
FIG. 6 is a schematic diagram of a squarer circuit which may be advantageously used in the illustrative embodiment.
Figure 7:
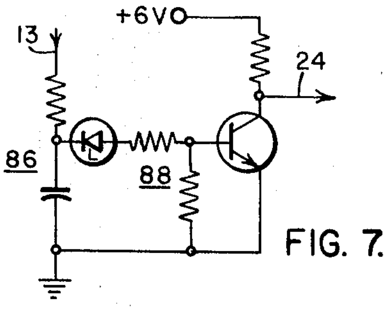
FIG. 7 is a schematic diagram of an average detector and threshold circuit which may be utilized in the illustrative embodiment of FIG. 1.
Figure 8:
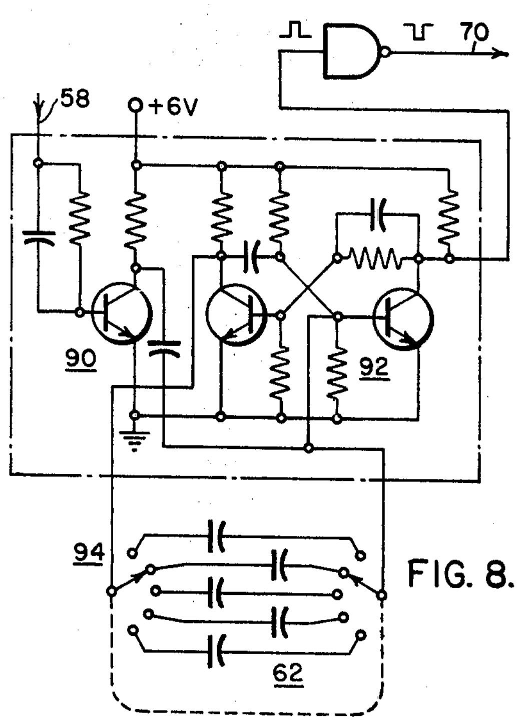
FIG. 8 is a schematic diagram of a One Shot generator for use in the illustrative embodiment.

Specific circuitry which may be utilized for elements shown in the illustrative embodiment of FIG. 1 is shown in FIGS. 6, 7 and 8.

A squarer circuit 2 that may be advantageously utilized is illustrated in FIG. 6. A plurality of switching circuits 80 are cascaded to respond to the input wave 6 and through the use of diode limiting circuits square the input signal for amplification by a final stage 82 to provide a square wave representation A of the input signal 6. Both squarer circuits 2 and 4 are selected so that distortion of the phase relationship between their inputs and outputs are held to a minimum. Because the squarer circuit 2 is a clipping circuit, level variations are not sensed—this is inherent to any squarer—thus one reason why a digital system is an improvement over an analog system. However, the squarer must be designed to handle the range of level variation without distortion. Because it is essentially insensitive to input level variations, changes in power levels and line impedances have little effect on its performance. The operation is basically the same over any frequency band for which the squarers are designed. Since two squarers 2 and 4 are used in the circuitry of FIG. 1, a simple adjustment which can be done during manufacture, is all that is necessary to align the two squarer output negative-going edges. The trimming circuit 84 provides this adjustment by setting the potentiometer to produce a small amount of phase delay in the squarer circuit and thereby permitting the negative-going edges of the two squarer circuits to be aligned. The differences in the two squarer circuits can thereby be compensated.

A representative average detector and threshold circuit 20 is illustrated in FIG. 7. When the input 13 is positive for a longer period of time than negative, a vice versa, the RC circuit 86 will provide a resultant charge on its capacitor to break down a Zener diode in the threshold circuit 88 thereby firing the switching transistor with a resultant output 24.

A representative reference pulse generator or One Shot generator 62 is illustrated in FIG. 8. The input signal 58 will be amplified by circuit 90 which in turn triggers the flip-flop 92 to provide a reference pulse 70 for comparison in the threshold circuit 38. The width of the reference pulse may be required to be altered as the frequency range of the system is changed. If such is the case, a trim selectivity circuit 94 could be switched to a new position each time the operating frequency range is changed. The switch varies the width of the One Shot pulse to maintain a constant threshold for all operating frequencies. Capacitors of the sensitivity circuit 94 are changed by a panel switch to vary the width of the One Shot pulse 70. This permits a threshold of a predetermined number of degrees to be maintained at any operating frequency. A 5° threshold is illustrative of one embodiment of the present invention and will be discussed in more detail hereinafter. Without the sensitivity switch, the One Shot pulse would have a constant width and the threshold would be a constant number of microseconds or nanoseconds, for example, at all frequencies, But the threshold in terms of degrees would vary with frequency. Thus, whether or not the One Shot pulse width should be adjusted depends upon the particular application. That is, if the requirement is to stay within a given phase angle error and if the operating frequency is variable, then the One Shot generator 62 must be adjustable. However, if the requirement is to stay within a given phase error of X number of nanoseconds (or microseconds) at all operating frequencies, then the trimming switch and its circuitry 94 is not required since the One Shot pulse width will be fixed.

Figure 9:
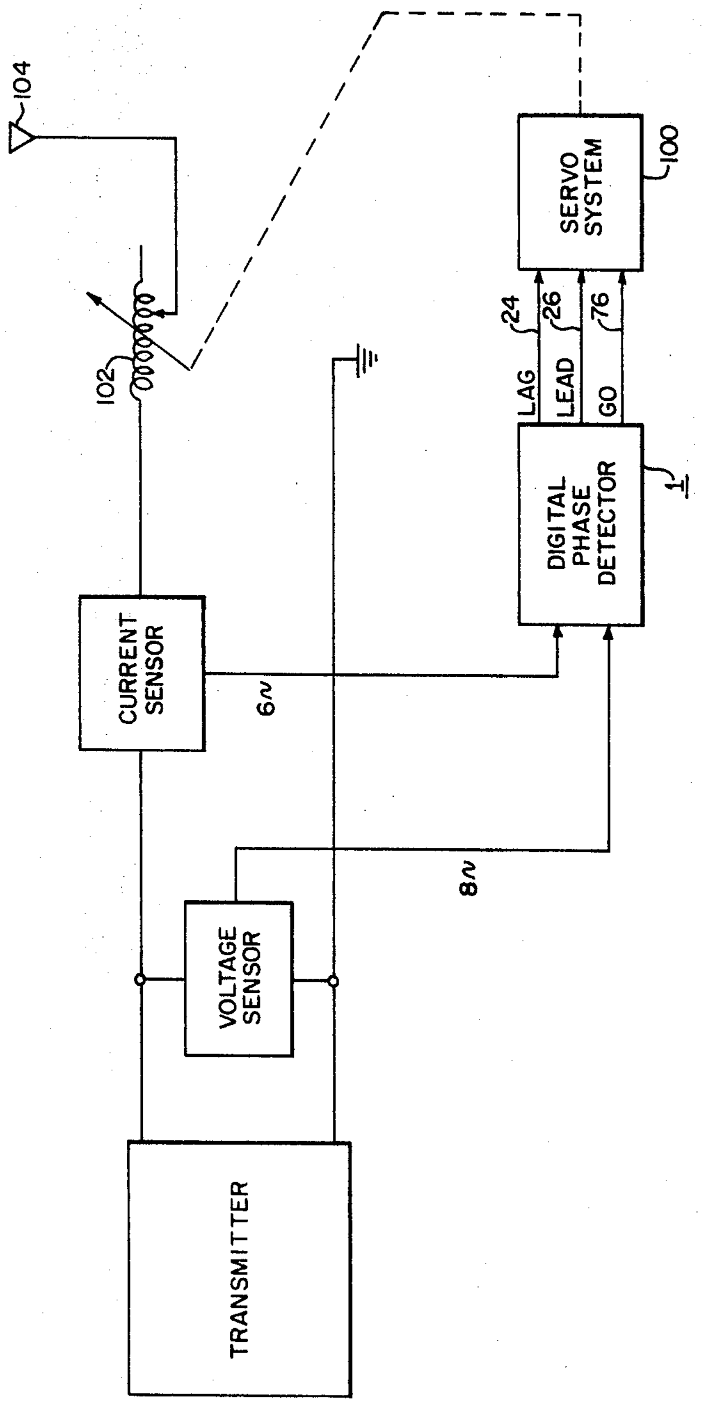
FIG. 9 illustrates the present invention applied in high-power antenna coupler of airborne transmitting equipment.

The present invention has been advantageously applied in a high-power antenna coupler of airborne transmitting equipment as shown in FIG. 9. A servo system 100, including a drive motor, is responsive to the output of the digital phase-detection circuit keeps a trailing-wire antenna automatically tuned to its transmitter. Samples of the antenna coupler input current 6 and voltage 8 are fed into the phase-detection circuit 2 where they are converted into digital form and examined for phase differences. Any changes in the antenna characteristics which result in a phase angle in excess of 5° between the coupler input voltage and current will cause the phase-detection circuit to turn on the drive motor of the servo system 100. The motor, which operates a variometer 102 in series resonance with the antenna 104, corrects the phase error by increasing or decreasing the variometer inductance as directed by the outputs of the phase-detector circuit. In this manner, the antenna is automatically maintained in tune and presents an essentially resistive load to the transmitter at all times.

Thus, it can be seen that the phase-detection circuitry of the present invention is capable of reliable operation in an aircraft environment with a minimum of maintenance and repair. The required power level may vary greatly, for example 1 kw. to 23 kw. The tuning time of the antenna coupler is very short even though the frequency may be regularly changed because of the simplicity of the servo tuning controls, only one, the One Shot pulse width control. The antenna coupler input resistance is required by the transmitter to have different values at different frequencies. Hence the phase detector should be independent of these changes to minimize adjustments. The circuit of this invention satisfies these requirements. Even though the operating frequency, power level, and line impedance at the point where the input voltage and current samples are obtained may vary over wide limits, the phase-threshold detector contains only one control. The circuitry of the present invention not only accurately detects small phase differences, but also provides an output signal to the drive motor indicating whether a clockwise or counterclockwise rotation is required and, once a given phase threshold is reached, it provides a signal which starts the motor and then stops it when the phase error is corrected.

A summary of the operation of the present invention can be provided as follows:

1. The input signal A is in phase with the input signal B. The lag output signal 24, lead output signal 26 and GO output signal 76 are all ONE's and the external circuits they operate are deenergized.

2. A lagging phase difference begins to develop between the two input signals. The lag output 24 changes to ZERO. This information notifies the circuits being controlled of the direction in which corrective action is to be taken. However, no action is taken as yet because the phase difference has not exceeded a predetermined value as determined by the width of the reference pulse provided by the One Shot generator 62 in the threshold circuit 38. The GO output 76 remains a ONE.

3. The phase difference continues to grow until the threshold is exceeded. The GO output 76 now changes to ZERO, the external circuits are turned on, and corrective action is taken in the proper direction to reduce the phase error.

4. The phase difference decreases until it is very near zero at which time the flip-flop 10 begins to divide by two again. The lag output 24 changes to ONE and the One Shot generator 62 ceases firing. The reset input 62 to the flip-flop 40 is enabled and the flip-flop 40 resets, changing the output 76 back to a ONE. The external circuit is turned off. The conditions are now the same as subparagraph 1.

5. The same type of sequence occurs when the phase error changes to leading.

While the present invention has been described with a degree of particularity for the purposes of illustration, it is to be understood that all modifications, alterations and substitutions within the spirit and scope of the present invention are herein meant to be included. For example, the lag output 24, lead output 26 and GO output 76 can be gated to form two outputs, a leading output and a lagging output. In this case, neither output is energized until a phase difference of a predetermined magnitude occurs with respect to the reference pulse 70 from the One Shot generator. A system could be made equivalent using logic other than NAND. An equivalent system could be made using flip-flops which operate from positive-going edges rather than from negative-going edges. Different type flip-flops might be used with some modifications.

I claim:

1. Circuitry for detecting phase difference between input signals having a positive-going edge and a negative-going edge comprising, in combination;

means responsive to the like-going edge of said input signals for providing a signal average indicative of the phase difference between said input signals;

detecting means responsive to said signal average compared to a predetermined magnitude for providing a lag indication, lead indication and in phase indication;

circuit means responsive to the lag, lead and in-phase indications for generating a string of pulses having widths the same as the phase difference between input signals whether leading or lagging, and no pulses when the phase difference is minimal;

means for comparing the pulse width of a pulse of said string of pulses to a reference pulse to provide a set pulse having a width equal to the amount by which the pulse width of each pulse of said string differs from the width of the reference pulse; and means responsive to said set pulse for providing an output until the phase error returns to a minimal value.

2. Circuitry for detecting phase difference between input signals comprising, in combination;

means for converting the input signal into digital square waves;

means responsive to the negative-going edge of said digital square waves for providing flip-flop output waveforms, the DC component of which being indicative of a leading or lagging phase difference;

means for detecting the average values of the flip-flop output waveforms and producing an output indication whenever the average value exceeds a given level;

pulse string generating means responsive to said output indication to generate a first pulse string from the negative-going edges of said digital square waves when the phase is leading and generating a second pulse string responsive to said input indication in response to the negative-going edges of said digital square waves when the phase is lagging and providing a disabling signal when the digital square waves are in phase;

One Shot generating means responsive to the occurrence of each pulse in said pulse waveform;

threshold circuit means for comparing the width of the pulses in each pulse string to the reference pulse and providing an output signal when the difference exceeds a predetermined magnitude; and means responsive to said average values to provide an output indicative of a leading or lagging phase difference.

3. The circuitry of claim 2 including:

means for removing said output indication when the phase difference is corrected.

4. Circuitry for detecting phase difference between input signals comprising, in combination;

means for converting the alternating waveforms of said input signals into digital square waves;

means for generating both leading and lagging pulse strings in response to the like-going edges of said digital square waves;

means responsive to the widths of pulses within said pulse strings exceeding the width of a reference pulse for providing a corrective output signal until the phase difference becomes less than a predetermined value.

5. Circuitry for detecting phase difference between input signals comprising, in combination;

means for converting the alternating waveforms of said input signals into digital square waves;

means responsive to the negative-going edge of said digital square waves for providing a flip-flop waveform which has an average in accordance with the phase difference between said digital square waves;

means for providing an output indication when the average value of the flip-flop waveform exceeds a predetermined magnitude;

means responsive to said indication for providing a pulse string having pulses of width directly related to the difference in phase between said input signals; and means responsive to the pulse string for providing a corrective output signal when the width of said pulses in the pulse string exceed the width of a reference pulse.

6. The apparatus of claim 5 wherein said last mentioned means includes gating means for comparing each reference pulse with a coincident pulse from said string to obtain a threshold signal should the width of a coincident pulse from said string be different than said reference pulse.

7. The apparatus of claim 6 including a second means for providing a flip-flop waveform;

means for enabling a reset input to said second means when the input signals are in phase;

means responsive to one of said input signals for resetting said second means when the input signals are in phase; and means for setting said second means in response to a negative-going edge of the corrective output signal.

8. A method of phase detecting comprising, in combination;

sensing the phase difference between two input signals;

notifying external circuitry of the direction in which correction action is to be taken;

inhibiting such corrective action until the phase difference exceeds some predetermined value;

energizing said external circuitry upon the phase difference exceeding said predetermined value; and initiating corrective action to reduce the phase error.

9. The method of claim 8 including the step of returning to normal operation upon correction of the phase error.